United States Patent
Aguaviva et al.

(10) Patent No.: US 8,607,151 B2
(45) Date of Patent: Dec. 10, 2013

(54) METHOD AND SYSTEM FOR DEBUGGING A GRAPHICS PIPELINE SUBUNIT

(75) Inventors: Raul Aguaviva, London (GB); Sebastien Julien Domine, San Jose, CA (US); William Orville Ramey, II, Santa Clara, CA (US)

(73) Assignee: Nvidia Corporation, Santa Clara, CA (US)

( * ) Notice: Subject to any disclaimer, the term of this patent is extended or adjusted under 35 U.S.C. 154(b) by 796 days.

(21) Appl. No.: 11/498,203

(22) Filed: Aug. 1, 2006

(65) Prior Publication Data

US 2008/0034311 A1 Feb. 7, 2008

(51) Int. Cl.
*G06F 9/44* (2006.01)

(52) U.S. Cl.
USPC .......................................... 715/771; 715/964

(58) Field of Classification Search
USPC .................................... 715/964, 771; 717/125
See application file for complete search history.

(56) References Cited

U.S. PATENT DOCUMENTS

| | | |
|---|---|---|
| 5,643,086 A | 7/1997 | Alcorn et al. |
| 5,752,062 A | 5/1998 | Gover et al. |
| 5,757,919 A | 5/1998 | Herbert et al. |
| 5,815,154 A * | 9/1998 | Hirschtick et al. ............ 715/853 |
| 5,892,904 A | 4/1999 | Atkinson et al. |
| 5,920,725 A | 7/1999 | Ma et al. |
| 5,970,147 A | 10/1999 | Davis |
| 5,978,484 A | 11/1999 | Apperson et al. |
| 5,999,737 A | 12/1999 | Srivastava |
| 6,016,474 A | 1/2000 | Kim et al. |
| 6,157,618 A | 12/2000 | Boss et al. |
| 6,266,416 B1 | 7/2001 | Sigbj.o slashed.rnsen et al. |
| 6,330,008 B1 | 12/2001 | Razdow et al. |
| 6,362,825 B1 | 3/2002 | Johnson |
| 6,412,039 B1 | 6/2002 | Chang |
| 6,668,325 B1 * | 12/2003 | Collberg et al. .............. 713/194 |
| 6,684,389 B1 | 1/2004 | Tanaka et al. |
| 6,732,060 B1 | 5/2004 | Lee |
| 6,901,582 B1 | 5/2005 | Harrison |
| 6,943,800 B2 | 9/2005 | Taylor et al. |
| 6,965,994 B1 | 11/2005 | Brownell et al. |
| 7,016,972 B2 | 3/2006 | Bertram et al. |
| 7,047,519 B2 | 5/2006 | Bates et al. |
| 7,095,416 B1 * | 8/2006 | Johns et al. ................... 345/522 |
| 7,107,484 B2 | 9/2006 | Yamazaki et al. |
| 7,173,635 B2 | 2/2007 | Amann et al. |

(Continued)

OTHER PUBLICATIONS gDEBugger, Jul. 29, 2005, http://www.gremedy.com.*

(Continued)

*Primary Examiner* — Andrea Leggett

(57) ABSTRACT

A method of debugging an application operable on a graphics pipeline subunit. A plurality of draw call groups is accessed. Each draw call group comprises a respective plurality of draw calls, sharing common state attributes of a prescribed state. The plurality of selectable draw call groups is displayed. In response to a user selection, a plurality of selectable draw calls associated with the selected draw call group is displayed. A plurality of selectable graphics pipeline subunits is displayed. In response to a user selection of a selected subunit, a plurality of editable state information and graphical primitives associated with a selected draw call are displayed. The plurality of editable state information may be grouped such that a portion sharing common attributes of the prescribed state are in one group. In response to a user selection, changes may be made to the selected draw call or the selected draw call group.

22 Claims, 10 Drawing Sheets

(56) References Cited

U.S. PATENT DOCUMENTS

| | | | |
|---|---|---|---|
| 7,237,151 B2 | 6/2007 | Swoboda et al. | |
| 7,260,066 B2 | 8/2007 | Wang et al. | |
| 7,277,826 B2 | 10/2007 | Castelli et al. | |
| 7,383,205 B1 | 6/2008 | Peinado et al. | |
| 7,395,426 B2 | 7/2008 | Lee et al. | |
| 7,401,116 B1 * | 7/2008 | Chalfin et al. | 709/203 |
| 7,401,242 B2 | 7/2008 | Abernathy et al. | |
| 7,420,563 B2 | 9/2008 | Wakabayashi | |
| 7,505,953 B2 | 3/2009 | Doshi | |
| 7,555,499 B2 | 6/2009 | Shah et al. | |
| 7,765,500 B2 | 7/2010 | Hakura et al. | |
| 7,778,800 B2 | 8/2010 | Aguaviva et al. | |
| 7,891,012 B1 | 2/2011 | Kiel et al. | |
| 8,436,864 B2 | 5/2013 | Aguaviva et al. | |
| 8,436,870 B1 | 5/2013 | Aguaviva et al. | |
| 8,448,002 B2 | 5/2013 | Bulusu et al. | |
| 8,452,981 B1 | 5/2013 | Kiel et al. | |
| 2001/0034835 A1 | 10/2001 | Smith | |
| 2001/0044928 A1 | 11/2001 | Akaike et al. | |
| 2002/0157086 A1 | 10/2002 | Lewis et al. | |
| 2002/0175839 A1 | 11/2002 | Frey | |
| 2003/0043022 A1 | 3/2003 | Burgan et al. | |
| 2003/0120935 A1 | 6/2003 | Teal et al. | |
| 2003/0214660 A1 | 11/2003 | Plass et al. | |
| 2004/0085894 A1 | 5/2004 | Wang et al. | |
| 2004/0130552 A1 | 7/2004 | Duluk, Jr. et al. | |
| 2004/0158824 A1 | 8/2004 | Gennip et al. | |
| 2004/0162989 A1 | 8/2004 | Kirovski | |
| 2005/0198051 A1 | 9/2005 | Marr et al. | |
| 2005/0222881 A1 | 10/2005 | Booker | |
| 2005/0243094 A1 | 11/2005 | Patel et al. | |
| 2005/0273652 A1 | 12/2005 | Okawa et al. | |
| 2005/0278684 A1 | 12/2005 | Hamilton et al. | |
| 2006/0047958 A1 | 3/2006 | Morais | |
| 2006/0079333 A1 | 4/2006 | Morrow et al. | |
| 2006/0080625 A1 | 4/2006 | Bose et al. | |
| 2006/0109846 A1 | 5/2006 | Lioy et al. | |
| 2006/0152509 A1 | 7/2006 | Heirich | |
| 2006/0161761 A1 | 7/2006 | Schwartz et al. | |
| 2006/0185017 A1 | 8/2006 | Challener et al. | |
| 2007/0115292 A1 | 5/2007 | Brothers et al. | |
| 2007/0274284 A1 | 11/2007 | Dendukuri et al. | |
| 2008/0007563 A1 * | 1/2008 | Aronson et al. | 345/589 |
| 2008/0095090 A1 | 4/2008 | Lee et al. | |

OTHER PUBLICATIONS gDEBugger, graphicREMEDY, http://www.gremedy.com, Aug. 8, 2006.

Duca et al.; A Relational Debugging Engine for the Graphics Pipeline; International Conference on Computer Graphics and Interactive Techniques; ACM SIGGRAPH 2005; pp. 453-463; ISSN:0730-0301.

"maxVUE Grapic Editor", Metso Automation, 2005, pp. 1-6, http://www.metsoautomation.com/automation/indes.nsf/FR?Readform &ATL=automation/ed_prod.nsf/WebWID/WTB-041110-22256F-2445A; eHB.

"ATI RADEON X800, 3D Architecture White Paper", ATI, 2005, pp. 1-13, with proof of seniority (4 pages), according to ACM bibligraghy regarding the document: "The Direct3D 10 System", ACM TOG, vol. 25, Iss. 3 (Jul. 2006), Reference 1; eHG.

N. Tatarchuk, "New RenderMonkey Features for DirectX and OpenGL Shader Development", Game Developers Conference, Mar. 2004.

gDEBugger, graphicREMEDY, http://www.gremedy.com/, Aug. 7, 2006.

A Relational Debugging Engine for the Graphics Pipeline, Duca et al., http://citeseer.ist.psu.edu/cache/papers/cs2/167/http:zSZzSzwww.cs.jhu.eduzSz~cohenszSzPublicationszSzgldb.pdf/a-relational-debugging-engine.pdf International Conference on Computer Graphics and Interactive Techniques, ACM SIGGRAPH 2005, pp. 453-463, LA, ISSN: 0730-0301.

gDEBugger, graphicREMEDY, http://www.gremedy.com/, Jul. 29, 2005.

C. Cebenoyan and M. Wloka, "optimizing the graphics pipeline", 2003, Nvidia GDC Presentation Slide.

Graphic Remedy; gDEBugger screen shots; pp. 1-18.

Jeffrey K. Hollingsworth and Barton P. Miller, "Dynamic Control of Performance Monitoring on Large Scale Parallel Systems", Jul. 23, 1993, ACM, International Conference on Supercomputing: Proceedings of the 7th International Conference on Supercomputing, pp. 185-194.

Dror G. Feitelson and Larry Rudolph, "Toward Convergence in Job Scheduling for Parallel Supercomputers", Aug. 1996, Springer, Job Scheduling Strategies for Parallel Processing: IPPS '96 Workshop Hololulu, Hawaii, Apr. 16, 1996 Proceedings.

Josh Lessard, "Profiling Concurrent Programs Using Hardware Counters", May 2005, University of Waterloo, Thesis, (abridged copy provided).

GPU Performance Optimization with NVPer1HUD. NVPerfHUD 4.0. A Heads-Up Display for Performance Analysis. NVIDIA Corporation, May 2006, Downloaded on Aug. 24, 2012 in archive.org under the following URL associated with a capture of Jul. 20, 2006: http://weg.archive.org/weg/20060720222056/http://developer.nvidia.com/objectinvperfhud_home.html.

Kiel, J. [et al.]: NVIDIA Performance Tools. Slides presented during the lecture given on the occasion of the Game Developers Conference in Mar. 2006, Downloaded on Aug. 28, 2012 in archive.org under the following URL associated with a capture of May 26, 2006: http://web.archive.org/web/20060526023128/http://download.nvidia.com/developer/presentations/2006/gdc/2006-G DC-Performance-Tools.pdf.

Online-Information on NVPerfHUD 4 in archive.org dated 20/07/2006, URL: http://web.archive.org/web/20060720222056/http://developer.nvidia.com/objectinvperfhud_home.html , [search carried out on Aug. 24, 2012].

Entry on Wikipedia dated Oct. 7, 2006 regarding the term "Debugger", URL:http://en.wikipedia.org/w/index.php?title=Debugger&oldid=63069774 , [search carried out on Aug. 27, 2012].

* cited by examiner

METHOD AND SYSTEM FOR DEBUGGING A GRAPHICS PIPELINE SUBUNIT

RELATED U.S. PATENT APPLICATION

This Application incorporates by reference U.S. patent application Ser. No. 11/498,229 filed on Aug. 1, 2006, by Aguaviva et al., and entitled "Method And User Interface For Enhanced Graphical Operation Organization" and assigned to the assignee of the present invention and U.S. patent application Ser. No. 11/487,863 filed on Aug. 1, 2006, by Aguaviva et al., and entitled "A Method And System For Calculating Performance Parameters For A Processor" and assigned to the assignee of the present invention in their entirety.

TECHNICAL FIELD

The present invention relates to the field of graphics processing units. More particularly, embodiments of the present invention relate to a method and system for debugging a graphics pipeline subunit.

BACKGROUND ART

The need to improve the efficiency of graphics processing units (GPUs) executing graphical applications has always been a primary concern of software developers. For example, bottleneck analysis is important to optimizing an application given that a pipelined GPU is only as fast as its slowest pipeline unit. Similarly, it is desirable to monitor the utilization of each unit of a graphics pipeline, thereby allowing load spreading and ensuring sufficient utilization of each unit at any given time. However, optimizing GPU performance and debugging a graphics pipeline subunit is a daunting task given the limited number of performance tools available, and the limited number of features that the conventional tools offer.

Conventional methods fail to provide detailed information for the setup of each subunit of the graphics pipeline and their state information when executing a graphical operation (e.g., a draw call). Accordingly, corrective actions are made through trial and error without a true knowledge of the setup of each subunit and their corresponding state information for a draw call. Moreover, any correction to remedy the problematic subunit of the GPU may negatively impact other subunits of the GPU. For example, reducing the bottleneck of one subunit may negatively impact the utilization of other subunits. Thus, developers often encounter minimal performance gains even if a bottleneck is corrected given the inability to monitor utilization information pertaining to pipeline subunits.

In addition to the inadequacies discussed above, even if a developer is able to remedy a bottleneck and increase the utilization of an under-utilized subunit for a given frame or graphical operation, performance for other frames and/or graphical operations may decrease. Thus, much time and effort is likely to be spent using conventional performance tools with little or no appreciable increase in the performance of the graphical application on a given GPU.

SUMMARY

Accordingly, there is a need to provide transparency for the setup of subunits of a GPU pipeline and their state information when executing a graphical operation (e.g., a draw call). Moreover, there is a need to provide transparency for editable state information because editing the state information may substantially improve the overall efficiency of the GPU pipeline and its frame rate. There is further a need to provide the above transparency within a debug tool that also allows automatic identification of problematic graphic operations of a frame. It will become apparent to those skilled in the art after reading the detailed description of the present invention that the embodiments of the present invention satisfy the above mentioned needs.

In one embodiment of the present invention, a plurality of selectable draw call groups that may be sorted by their execution time, is accessed and displayed by a graphical user interface. In response to a user selection of a select draw call group, a plurality of selectable draw calls are displayed from that group. All draw calls of each draw call group share common state attributes of a prescribed state. Identifiers of a plurality of selectable graphics pipeline subunits are also displayed. In response to a user selection of a draw call associated with a draw call group and a selection of a subunit, a plurality of editable state information is automatically displayed (e.g., a text window). In response to a user editing the state information, a plurality of data repository settings is changed. Additionally, editing the state information is applied to a selected draw call or a selected draw call group in response to a user selection.

As a result of employing the embodiments of the present invention, subunit setup information and state information become transparent to the developer. Accordingly, a user may make an informed decision as to editing the state information to improve the overall efficiency of the GPU pipeline and its frame rate.

More specifically, an embodiment of the present invention pertains to a method of debugging and/or optimizing an application operable on a graphics pipeline subunit, the method includes accessing a plurality of draw call groups, wherein each draw call group comprises a respective plurality of draw calls that all share common state attributes of a prescribed state; displaying in a first window said plurality of draw call groups and allowing user selection thereof; in response to a user selection of a draw call group, displaying a plurality of draw calls associated with the selected draw call group and allowing user selection thereof; displaying in a second window, identifications of a plurality of graphics pipeline subunits and allowing user selection thereof; and in response to a user selection of a selected graphics pipeline subunit, displaying a plurality of state information of the selected graphics pipeline subunit associated with the selected draw call.

Embodiments include the above and wherein the method further includes displaying graphical primitives rendered by the selected pipeline subunit resultant from execution of said selected draw call. The embodiments further include the above and further including displaying performance data for the selected draw call and the draw call group pertaining to the selected graphics pipeline subunit, wherein the performance data indicates a time for the plurality of graphics pipeline subunits to execute the selected draw call group, and wherein the performance data further indicates a time for the selected graphics pipeline subunit to execute the selected draw call.

Furthermore, embodiments include the above and wherein the method further includes allowing user editing of the plurality of state information. Moreover, embodiments include the above and wherein the plurality of draw call groups and plurality of draw calls are ranked by execution time of the group and the draw call respectively. Additionally, embodiments include the above and wherein displaying the plurality of state information further includes grouping the plurality of state information such that a portion of the plurality of state information that are common across said selected draw call group are depicted together.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

Figure 1:
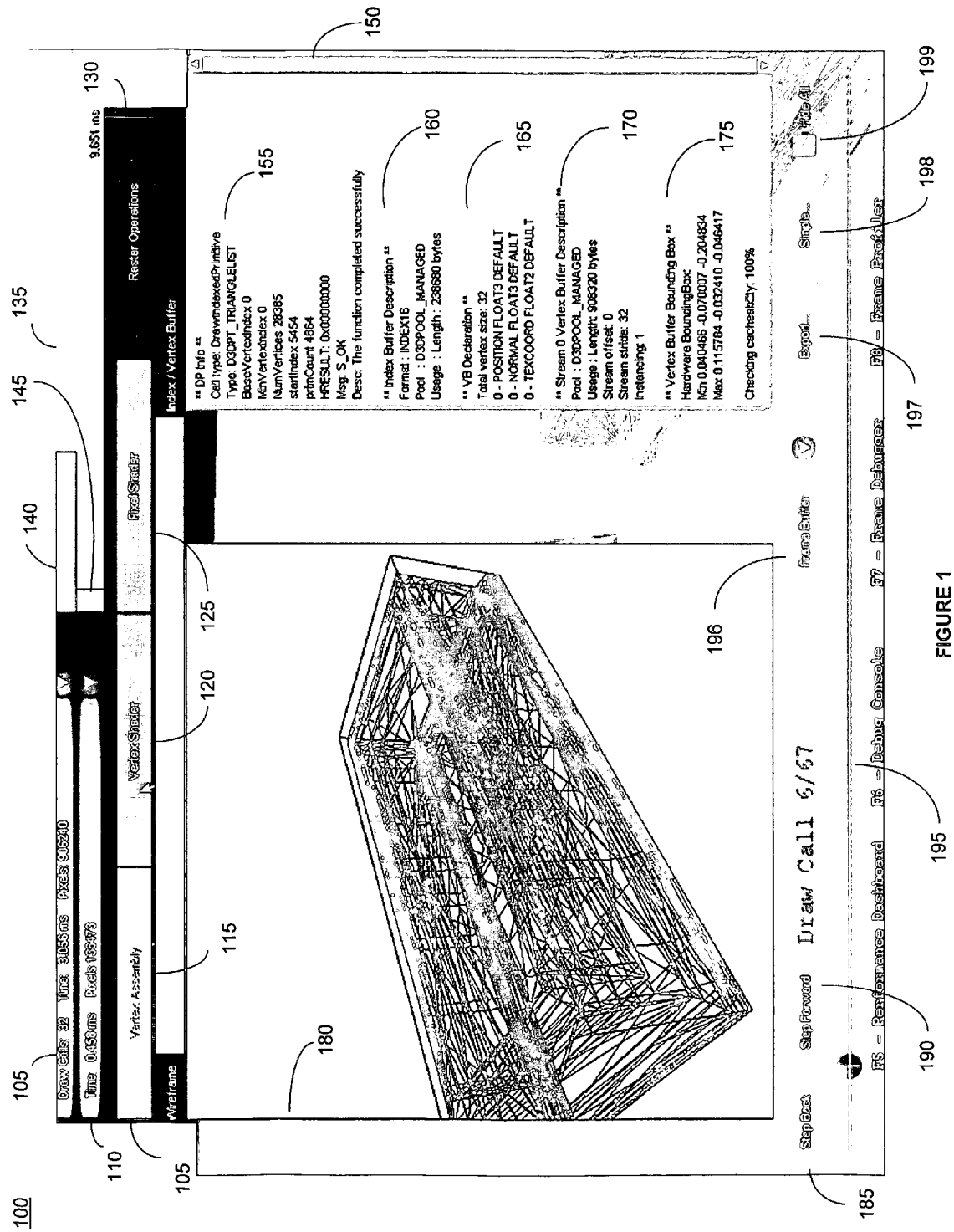
FIG. 1 shows an exemplary screen shot of a user interface for displaying state information for a selected subunit executing a selected draw call in accordance with one embodiment of the present invention.

Reference will now be made in detail to embodiments of the present invention, examples of which are illustrated in the accompanying drawings. While the invention will be described in conjunction with these embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be evident to one of ordinary skill in the art that the present invention may be practiced without these specific details. In other instances, well known methods, procedures, components, and circuits have not been described in detail as not to unnecessarily obscure aspects of the invention.

Notation and Nomenclature

Some portions of the detailed descriptions which follow are presented in terms of procedures, steps, logic blocks, processing, and other symbolic representations of operations on data bits that can be performed on computer memory. These descriptions and representations are the means used by those skilled in the art to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing" or "creating" or "transferring" or "executing" or "determining" or "instructing" or "issuing" or "halting" or "clearing" or "accessing" or "aggregating" or "obtaining" or "selecting" or "calculating" or "measuring" or "displaying" or "accessing" or "allowing" or "grouping" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

A Method and System for Debugging a Graphics Pipeline Subunit

A GPU pipeline typically executes a graphical operation (e.g., a draw call) as instructed by a driver program operating on a host computer processor. A frame includes a plurality of draw calls. Various performance parameters (e.g., bottleneck and utilization information) for subunits of the GPU pipeline are calculated. Calculating these performance and other parameters is discussed in U.S. patent application Ser. No. 11/497,863 filed on Aug. 1, 2006, by Aguaviva et al., and entitled "A Method And System For Calculating Performance Parameters For A Processor" and incorporated herein in its entirety. Draw calls may be automatically formed into draw call groups in response to user specified common state attributes. Grouping draw calls based on common state attributes is discussed in U.S. patent application Ser. No. 11/498,229 filed on Aug. 1, 2006, by Aguaviva et al., and entitled "Method And User Interface For Enhanced Graphical Operation Organization" and incorporated herein in its entirety.

Referring now to FIG. 1 an exemplary computer controlled user interface 100 for displaying state information for a selected subunit executing a selected draw call from a selected draw call group in accordance with one embodiment of the present invention is shown. The user interface accesses and displays the selectable draw call groups in a drop down menu 105. Each draw call group has common state attributes as discussed in U.S. patent application Ser. No. 11/498,229 filed on Aug. 1, 2006, by Aguaviva et al., and entitled "Method And User Interface For Enhanced Graphical Operation Organization". The drop down menu 105 may display the number of draw calls in a draw call group, the group's total execution time and the number of pixels processed. The group's execution time is the amount of time required by the GPU pipeline to execute the draw call group. In this example, the selected draw call group contains 32 draw calls and is executed in 3.056 ms by the GPU pipeline. Additionally, the GPU pipeline will have written to 906240 pixels after completely executing the selected draw call group. It is appreciated that use of drop down menu is exemplary and not limiting. For example, other embodiments may use a popup window to display the selectable information. Alternatively, the information may be displayed in other selectable formats, in a table or through a link.

The drop down menu 110 displays all the draw calls in a selected draw call group. The drop down menu 110 may further display the execution time of the draw calls and the number of pixels processed by the GPU pipeline. In this example, the draw call is executed in 0.458 ms by the GPU pipeline. Additionally, the GPU pipeline will have written to 136473 pixels after completely executing the selected draw call. It is appreciated that use of drop down menu is exemplary and not limiting. For example, other embodiments may use a popup window to display the selectable information. Alternatively, the information may be displayed in other selectable formats, in a table or through a link.

Referring still to FIG. 1, the user interface 100 includes a plurality of selectable items for selecting a pipeline subunit within the GPU pipeline. In this embodiment, the selectable subunits are the vertex assembly 115, the vertex shader 120, the pixel shader 125, and the raster operations 130. Other embodiments may have fewer or more or different subunits depending on the pipeline architecture. It is appreciated that the use of tab as a selectable tool is exemplary and not limiting. For example, other embodiments may use a popup window to display the selectable information. Alternatively, the information may be displayed in other selectable formats, in a table or through a link.

In response to a user selection of a draw call group, a draw call of that group and a subunit, the embodiments then may display performance information relating thereto. The performance information may be displayed in a bar graph format as shown in 135, 140 and 145. The bar graph 135 displays the time required for the GPU subunit to execute a frame. In this example, the GPU subunit executes the frame in 9.651 ms. The bar graph 140 displays the amount of time required by the GPU subunit to execute the selected draw call group. The bar graph 145 displays the amount of time required by the selected subunit to execute the selected draw call. Accordingly, the bar graphs that are shown change when the frame changes, or when the selected draw call group changes, or when the selected draw call is change, or when the selected sub unit changes. It is appreciated that the use of bar graph is exemplary and not limiting. Accordingly, other embodiments may employ other methods to display the performance information, potentially displaying more or less information. It is further appreciated that performance information discussed are exemplary and not limiting. As such, other performance information may be displayed (e.g., utilization and bottleneck).

In response to a user selection of a draw call group, a draw call and a subunit, the state information for the selected draw call corresponding to the selected subunit is displayed in window 150 according to embodiments of the present invention. In this example, the draw call group having 32 draw calls, with the draw call executing in 0.458 ms, and the vertex assembly 115 subunit are selected. The state information includes the selectable parameters pertinent to the pipeline unit for set-up, configuration and programming in order to process the draw call, e.g., for drawing primitives 155. State information for drawing primitives are settings and values required to draw the primitives (e.g., a triangle). In this example, the defined primitive type is a triangle. The number of vertices used or primitive count may also be displayed. For example, the number of vertices is 28385 and the primitive count is 4864.

The state information may also include the description of the index buffer 160. The index buffer may define the type and the format of the memory buffer. Additionally, the index buffer may define the location of the memory pool.

The state information may further include the vertex buffer declaration 165. The vertex buffer declaration 165 defines the vertex size, the offsets or streams that the positions, normals, and tangents for each individual vertex are located in the vertex buffer, to name a few. In this example, the vertex size is 32. The state information for stream vertex buffer description 170 is similar to that of the vertex buffer description. The state information may also include the vertex buffer bounding box 175. The vertex buffer bounding box 175 may define the extent of the geometry in object space.

The state information may be inspected by a software developer for inefficiencies, etc. Typically the software developer will select the draw call with a high execution time for state analysis and make modifications to the draw call setup parameters, and possibly other draw calls that share the same parameters for the operation, will have a significant impact on frame rate performance if optimized. The state information within this window 150 may be edited by the user.

The graphical primitives of the selected draw call for the selected subunit may be rendered in window 180 based on the state information in the window 150. This rendering might be a wireframe rendering allowing the software developer to gain insight into potential errors in the original model data, or a fully shaded rendering to inspect rendering irregularities. In this embodiment, the user may scroll to other draw calls in the selected draw call group by using the drop down menu 110. Alternatively, the user may scroll through the draw calls by using the step backward button 185 to go in reverse order or by using step forward button 190 to scroll through in order. Alternatively, the user may use a slider 195 to scroll through the draw calls. Accordingly, the debugger may be used to step through the scene, one draw call at a time. Therefore, for each draw call, the user can see the geometry, textures, shaders, and raster operations settings used. It is appreciated that scrolling through draw calls updates the performance information in the bar graph 145. It is further appreciated that scrolling through draw calls updates the state information in window 150. As such, scrolling through draw calls updates the graphical primitives in the window 180 in the sequential order of their execution, thereby allowing the user to learn the reason for the problematic draw call or draw call group.

Referring still to FIG. 1, the rendering depicted in window 180 may be modified by drop-down menu 196. In response to a selection of a menu item of menu 196, a different depiction of rendering information corresponding to the selected menu item may be displayed. For example, data within the frame buffer corresponding to one or more identified graphical operations may be displayed within window 180. Alternatively, rendering information corresponding to one or more identified graphical operations may be displayed, where the rendering information comprises one or more rendered objects in a wireframe view. And in other embodiments, other selections from menu 196 may enable the display of other characteristics (e.g., depth buffer information, alpha channel overlay, etc.) of rendered objects corresponding to one or more identified graphical operations.

Export button 197 provides the ability to export execution, state information and performance information for viewing in alternative forms. The exported data may form text and/or graphical images. As such, another application and/or user interface may be used to access and present the exported data.

"Simple" button 198 enables the presentation of less information (e.g., in a separate pop-up window removal of the graphical interface overlays) relating to the processing of the data stream by various pipeline units of the graphics processing pipeline. The information may be used to simplify the processing of the data stream. Accordingly, a user may use the simplify processing of the data stream to locate a problematic subunit and the problematic draw call group. As such, the debugging user interface can be used to take necessary corrective actions to the remedy the problematic draw call, problematic draw call group, or problematic subunit. As a result, the performance and the frame rates of the GPU pipeline is improved.

In one embodiment, the user interface provides a button 199 such that the selecting the button 199 hides the drop down menus 105 and 110, as well as the bar graphs 135, 140 and 145, along with the windows 150 and 180 and the selectable subunits 115, 120, 125, and 130. As such, selecting button 199 displays the draw calls drawn for a frame up to the last draw call executed. The graphical interface elements may obscure an area of interest in the underlying rendering thus causing confusion for the software developer. The software developer can choose the "Simple" button 198 to remove the graphical interface, allowing them to regain situational awareness. Then, the software engineer can re-enabling the graphical interface and continue optimization activities. Other embodiments may hide parts of the graphical user interface described above.

In one embodiment of the present invention, the state information in window 150 may be edited by the user, e.g., as a word processor function. It is appreciated that in one embodiment, editing state information changes the underlying application. Accordingly, the state information provides the user with transparency as to the exact state attribute values at different subunits for a problematic draw call and/or a problematic draw call group. Moreover, by selecting a draw call group that has the significant execution time, the user can attack and optimize lengthy draw calls. Accordingly, with fewer changes significant frame improvement can be realized.

In one embodiment, the state information of window 150 may be grouped such that the state information having common attributes across the draw call group are grouped together and the remaining state information are grouped together. Accordingly, editing state information that have common attributes can be applied to all draw calls with those common attributes. As a result, editing this state information impacts the selected draw call group and all of the draw calls therein. Alternatively, the user may edit the group without common attributes. As such, editing the unique state information impacts the draw call that contains that state information. It is appreciated that grouping state information to these above described groups may be done by color coding the state information in one embodiment. Alternatively, a popup window may ask the user whether the user wishes to apply the changes only to the selected draw call or to the selected draw call group if those attributes are shared. Other embodiments may employ other methods to group the state information together.

Figure 2:
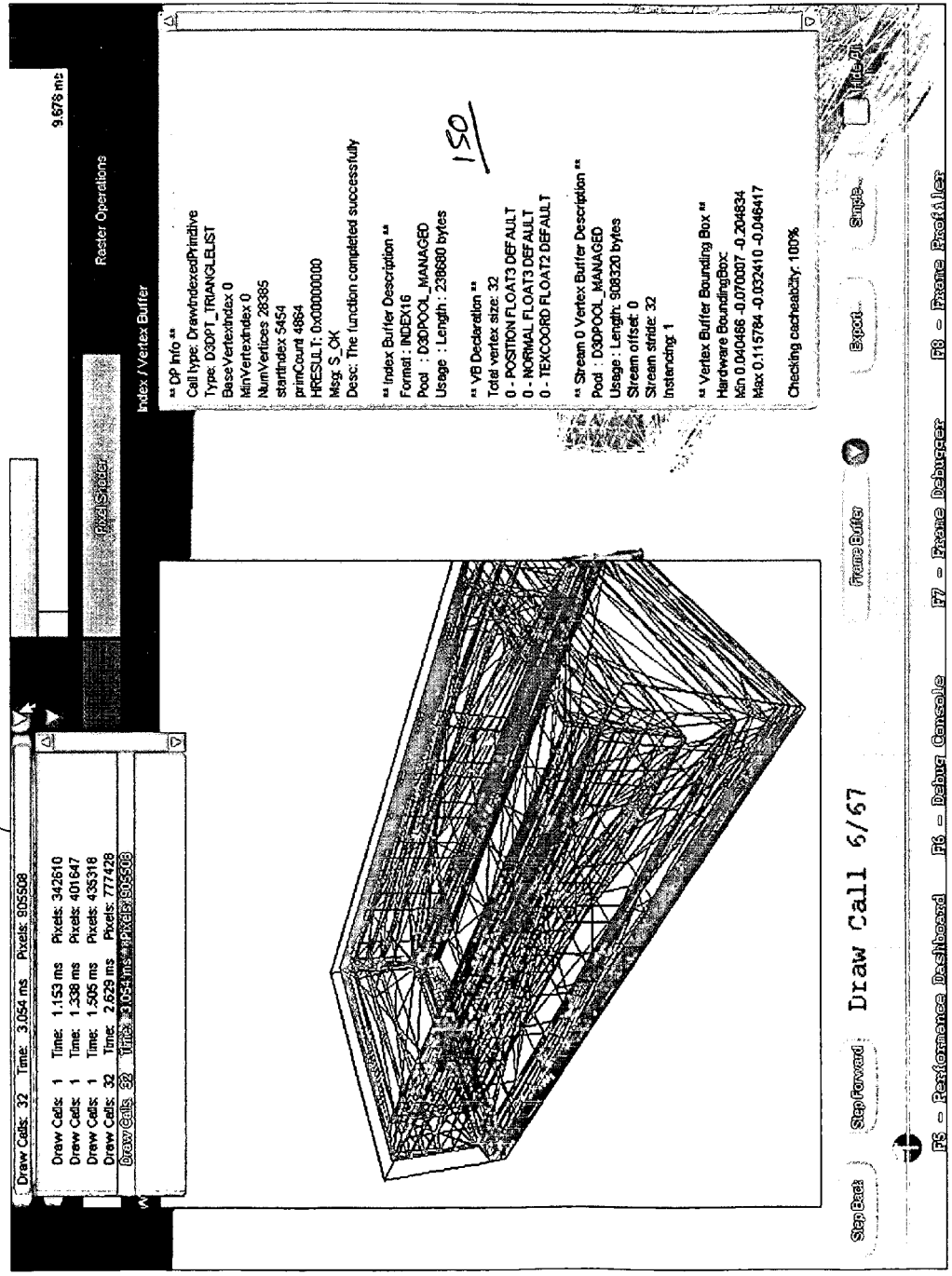
FIG. 2 shows a screen shot of an exemplary user interface for selecting a draw call group in accordance with one embodiment of the present invention.

Referring now to FIG. 2, an exemplary user interface for selecting a draw call group from a listing of groups in accordance with one embodiment of the present invention is shown. As discussed above, each draw call group is defined by a set of common state attributes. In this example, the dropdown menu 105 contains five draw call groups. In one embodiment, the draw call groups are sorted or ranked in order of their respective execution time. For example, draw call groups may be sorted in increasing order of their execution time. Accordingly, draw call groups with significant execution time may be selected because optimizing a draw call group with the lengthy execution time may more effectively improve the efficiency of the GPU pipeline than optimizing a draw call group with a shorter execution time. It is appreciated that in this embodiment, displaying the state information in window 150 is driven by selecting a draw call from the drop down menu 110. As such, in this embodiment, selecting a draw call group does not change the value of the state information in window 150.

Figure 3:
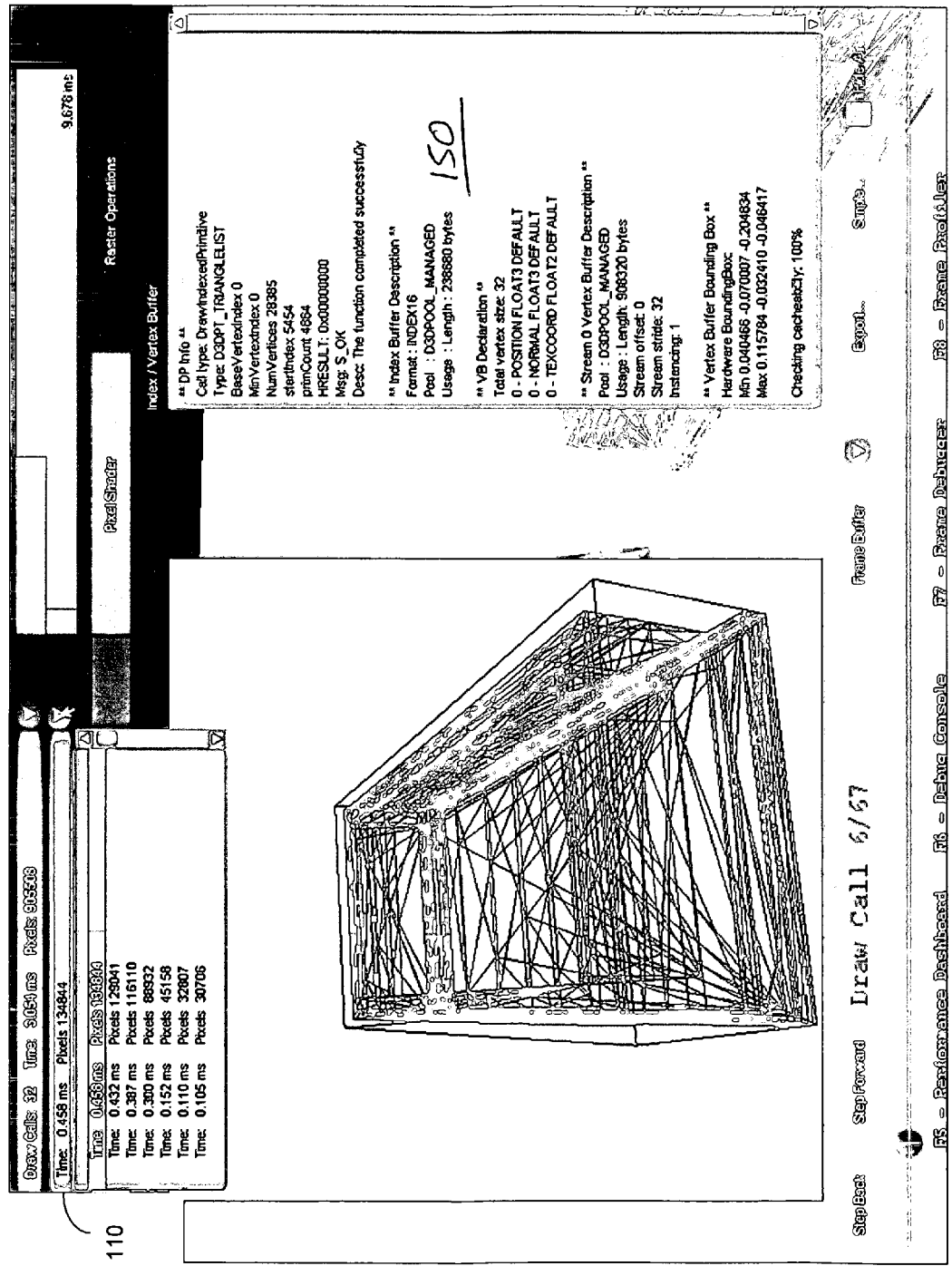
FIG. 3 shows a screen shot of an exemplary user interface for selecting a draw call in accordance with one embodiment of the present invention.

Referring now to FIG. 3, an exemplary user interface for selecting a draw call of the selected group in accordance with one embodiment of the present invention is shown. As discussed above, the selected draw call group contains 32 draw calls in that group. Accordingly, using the drop down menu 110 the user may scroll through different selectable draw calls. In one embodiment, the draw calls are sorted in the order of their respective execution time. For example, draw calls may be sorted in the decreasing order of their execution time. Accordingly, the draw call with the longest execution time is the most expensive draw call executed by the GPU pipeline. Accordingly, optimizing the significant draw calls effectively improves the performance and the execution time of the GPU pipeline. Selection of a draw call causes its associated state information to be displayed in window 150.

Figure 4:
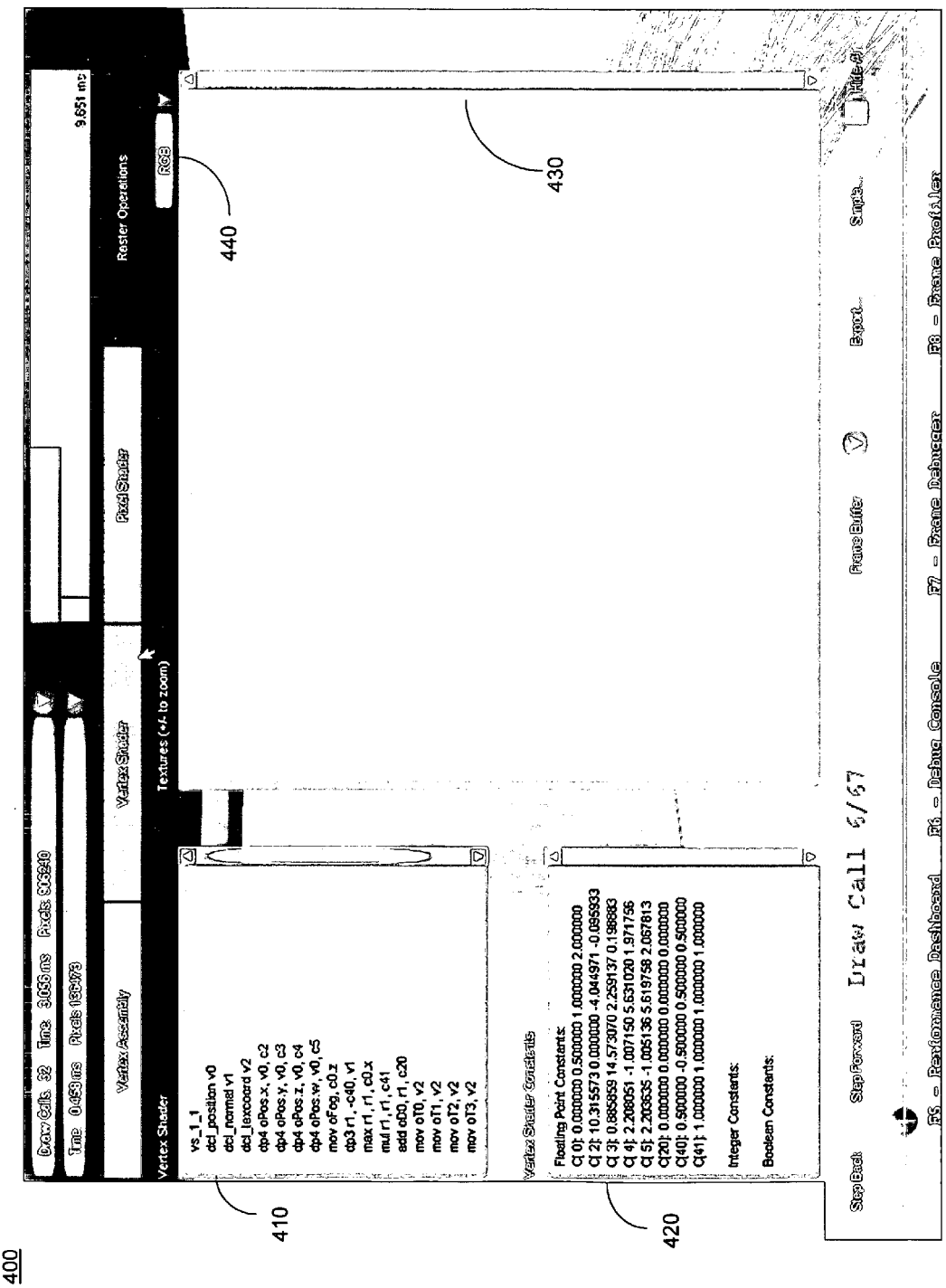
FIG. 4 shows a screen shot of an exemplary user interface for displaying state information for a selected subunit executing a selected draw call in accordance with one embodiment of the present invention.

Referring now to FIG. 4, an exemplary user interface for displaying state information for a selected subunit executing a selected draw call in accordance with one embodiment of the present invention is shown. FIG. 4 shows the state information being displayed for the same selected draw call group, the same selected draw call but a different subunit. In this example, the subunit selected is the vertex shader 120. In one embodiment, selecting the vertex shader 120 displays a vertex shader window 410 and a vertex shader constant window 420. As such, any constants and textures used by the vertex shader 120 are displayed for inspection. The vertex shader window 410 displays the vertex shader assembly language being executed on each vertex. The vertex shader constants window 420 displays the constants. The constants provide transformation matrices, smoothing parameters, skinning parameters, lighting and displacement constants, to name a few. In general, the vertex shader constant window 420 provides the information for modifying the geometry. Selecting the vertex shader subunit 120 further provides a texture window 430. Texture window 430 enables moving a vertex based on the value of the texture. RGB tab 440 enables the user to view different channels, enabling the user to see different information which might be encoded across various color channels in the texture. For example, in this embodiment there are three channels provided, red, green and blue.

As discussed above, the state information or the texture data may be edited. Accordingly, the state information displayed in the vertex shader window 410 may be edited. It is appreciated that this embodiment provides a magnifying capability such that the user is capable of magnifying the textures.

Figure 5:
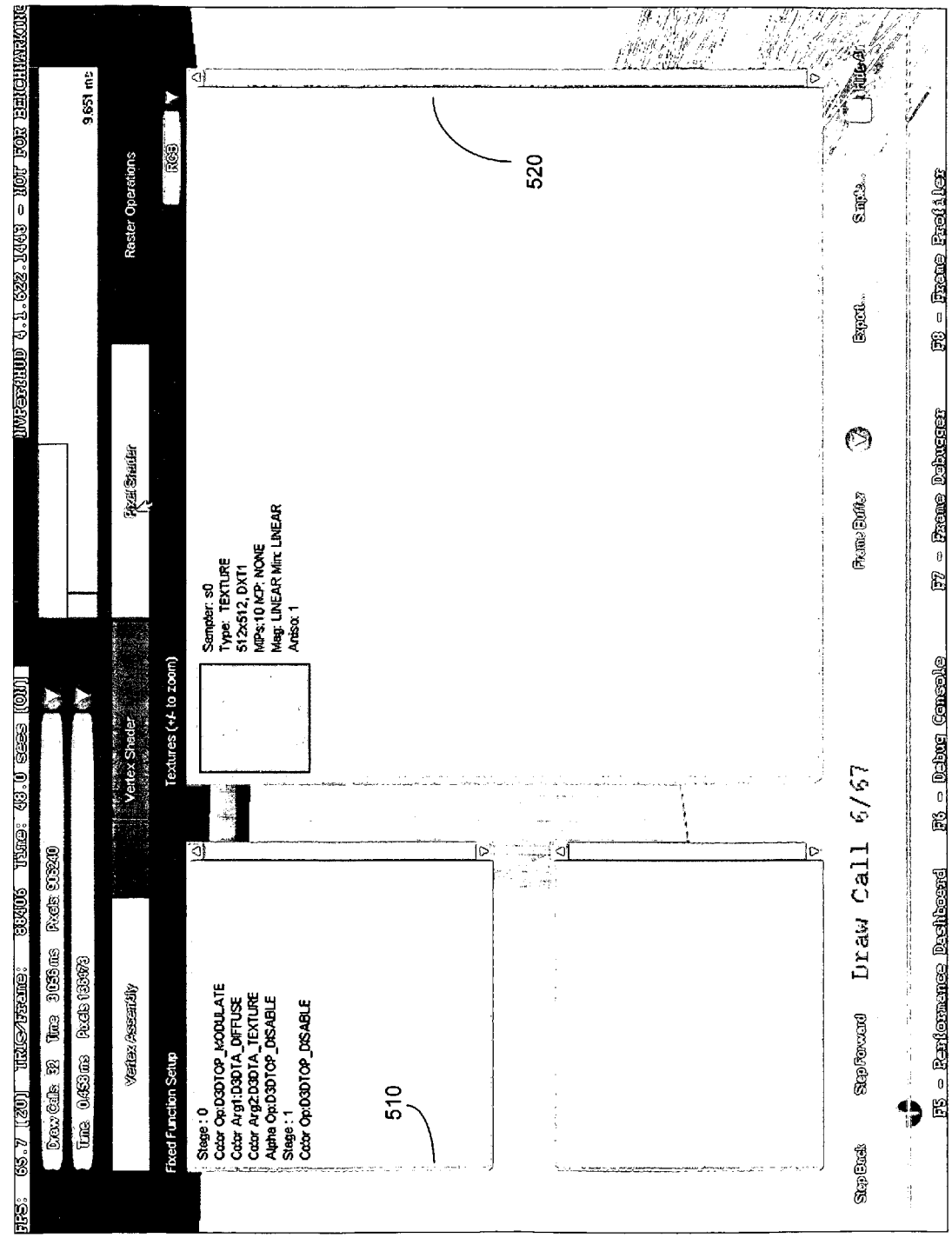
FIG. 5 shows a screen shot of an exemplary user interface for displaying state information for a selected subunit executing a selected draw call in accordance with one embodiment of the present invention.

Referring now to FIG. 5, an exemplary user interface for displaying state information for a selected subunit executing a selected draw call in accordance with one embodiment of the present invention is shown. FIG. 5 shows the state information being displayed for the same selected draw call group, the same selected draw call but a different subunit. In this example, the subunit selected is the pixel shader 125. In one embodiment, selecting the pixel shader 125 displays a fixed function setup window 510. When the pixel shader 125 program is selected, any constants and textures used by the pixel shader 125 program are displayed for inspection. The fixed function setup window 510 contains predefined functions that have limited programmability. Accordingly, parameters for and combinations of predefined functions may be used in order to create other functions. As such, the state information may be edited in order to create new functions based on the predefined functions.

Alternatively, selecting the pixel shader 125, a programmable window (not shown) may be displayed. The programmable window contains state information that may be edited. These include the assembly language programming running on the pixel shader subunit and any constants related to that program that might specify, for example, light positions, material parameters, etc. Selecting the pixel shader 125 may display a texture window 520. The texture window 520 functions similar to that of the texture window 430 in FIG. 4. Accordingly, the texture window 520 may provide a light map, a normal map, a lookup table for sin or cosine values and a square root map, to name a few.

Figure 6:
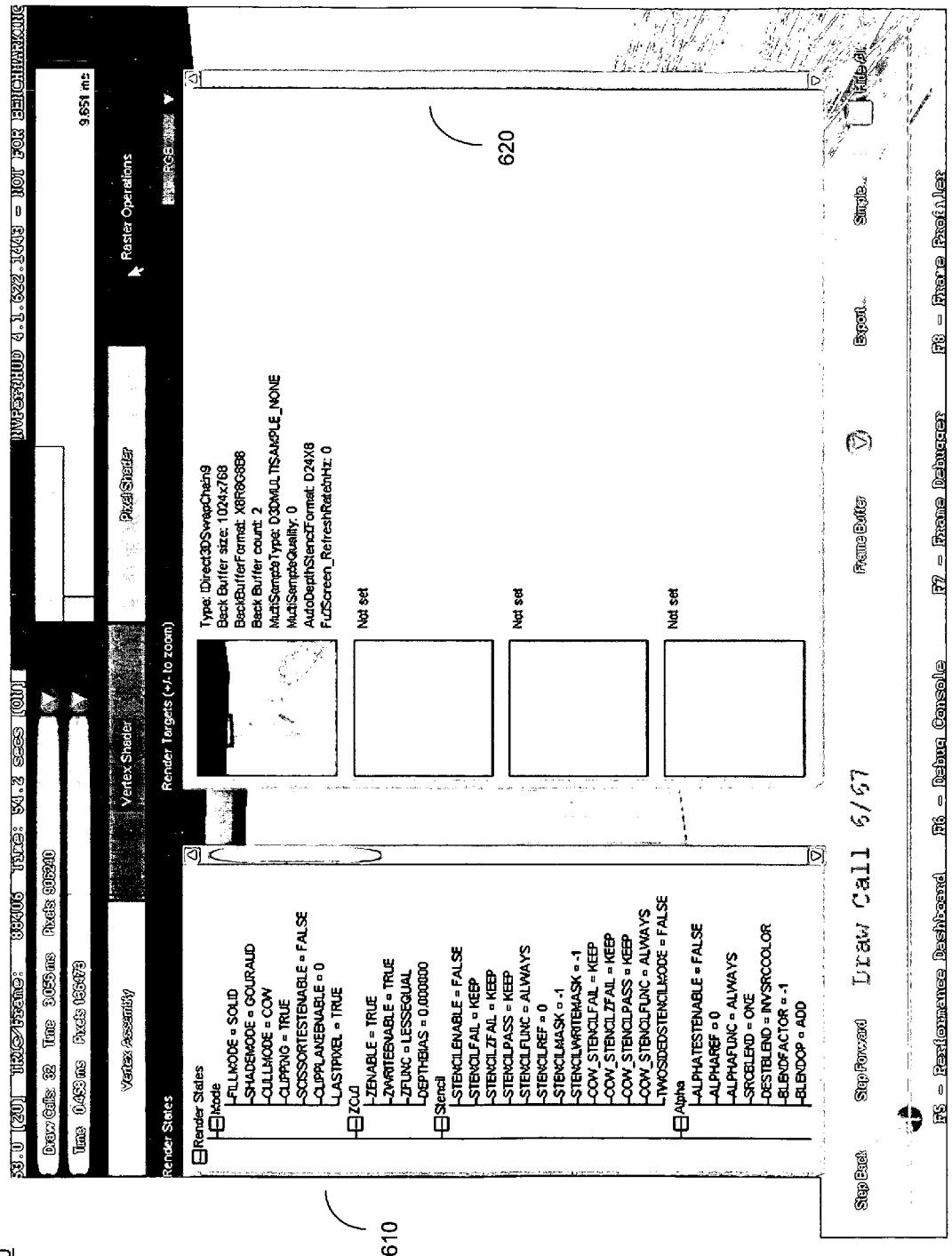
FIG. 6 shows a screen shot of an exemplary user interface for displaying state information for a selected subunit executing a selected draw call in accordance with one embodiment of the present invention.

Referring now to FIG. 6, an exemplary user interface for displaying state information for a selected subunit executing a selected draw call in accordance with one embodiment of the present invention is shown. FIG. 6 shows the state information being displayed for the same selected draw call group, the same selected draw call but a different subunit. In this example, the subunit selected is the raster operation 130. In one embodiment, selecting the raster operation 130 displays the render states window 610. The render state window 610 contains a tree structure for a plurality of settings that are provided in a collapsible tree to help manage the large amount of data. Various rendering states in the raster operations 130 may be changed. For example, alpha blending may be turned off. The render states window 610 impacts the render setup.

Selecting the raster operations 130 displays the render target in the render target window 620. The render target window 620 displays state information such as memory pool location and bit depth, to name a few. In general, the render target window 620 displays the location to which the result of a rendering operation is written. Accordingly, editing the state information may effect various operations such as memory access, etc.

Figure 7:
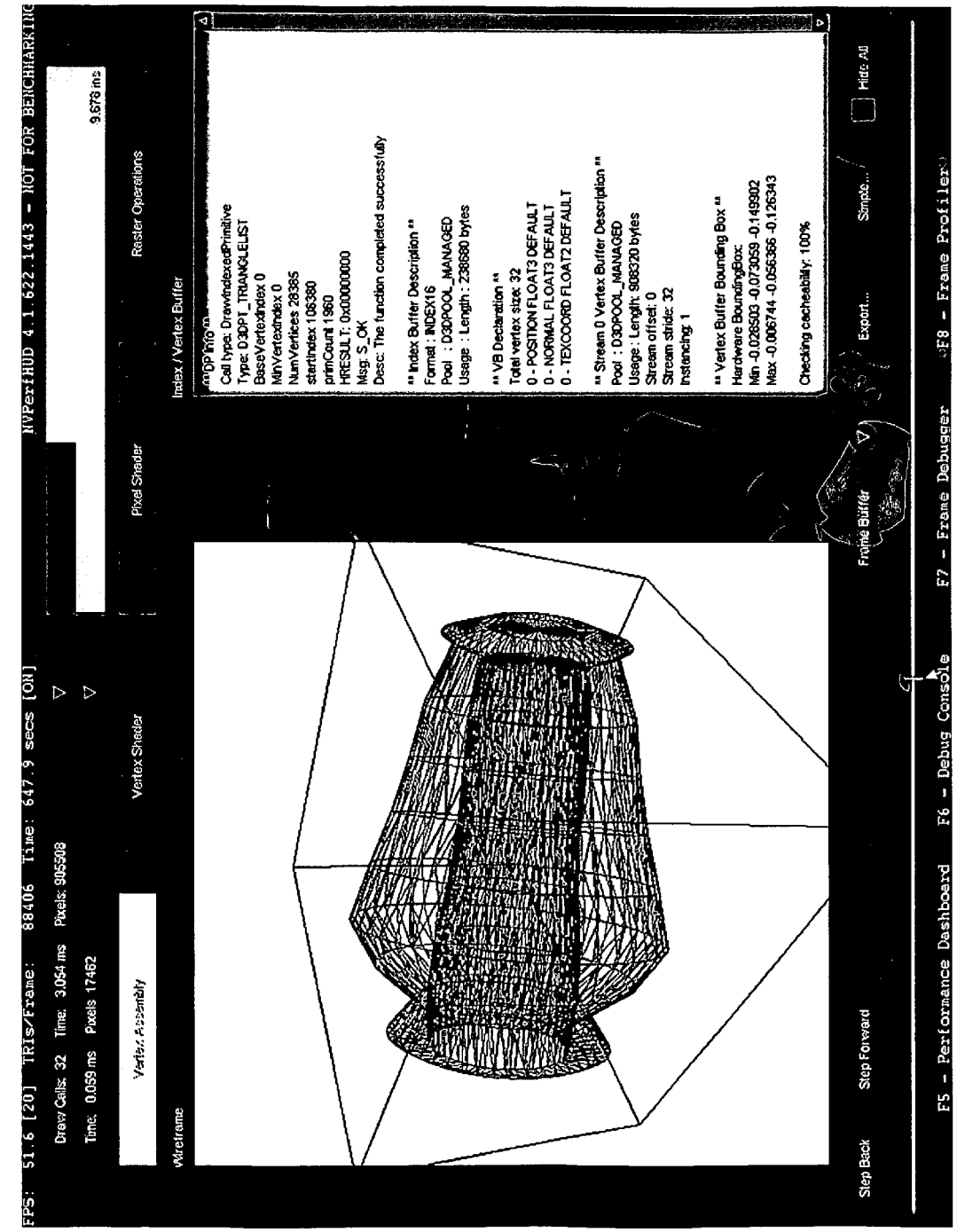
FIG. 7 shows a screen shot of an exemplary user interface for displaying state information corresponding to a selected draw call executed on a selected subunit in accordance with one embodiment of the present invention.

Referring now to FIG. 7, an exemplary user interface for displaying state information corresponding to a selected draw call executed on a selected subunit in accordance with one embodiment of the present invention is shown. In this example, the state information for draw call number 30 out of 67 is displayed in window 150. The graphical primitive 180 depicts a container being drawn by the GPU pipeline. As discussed above, the state information may be edited affecting the performance and the execution of the selected draw call and/or the selected draw call group.

Figure 8:
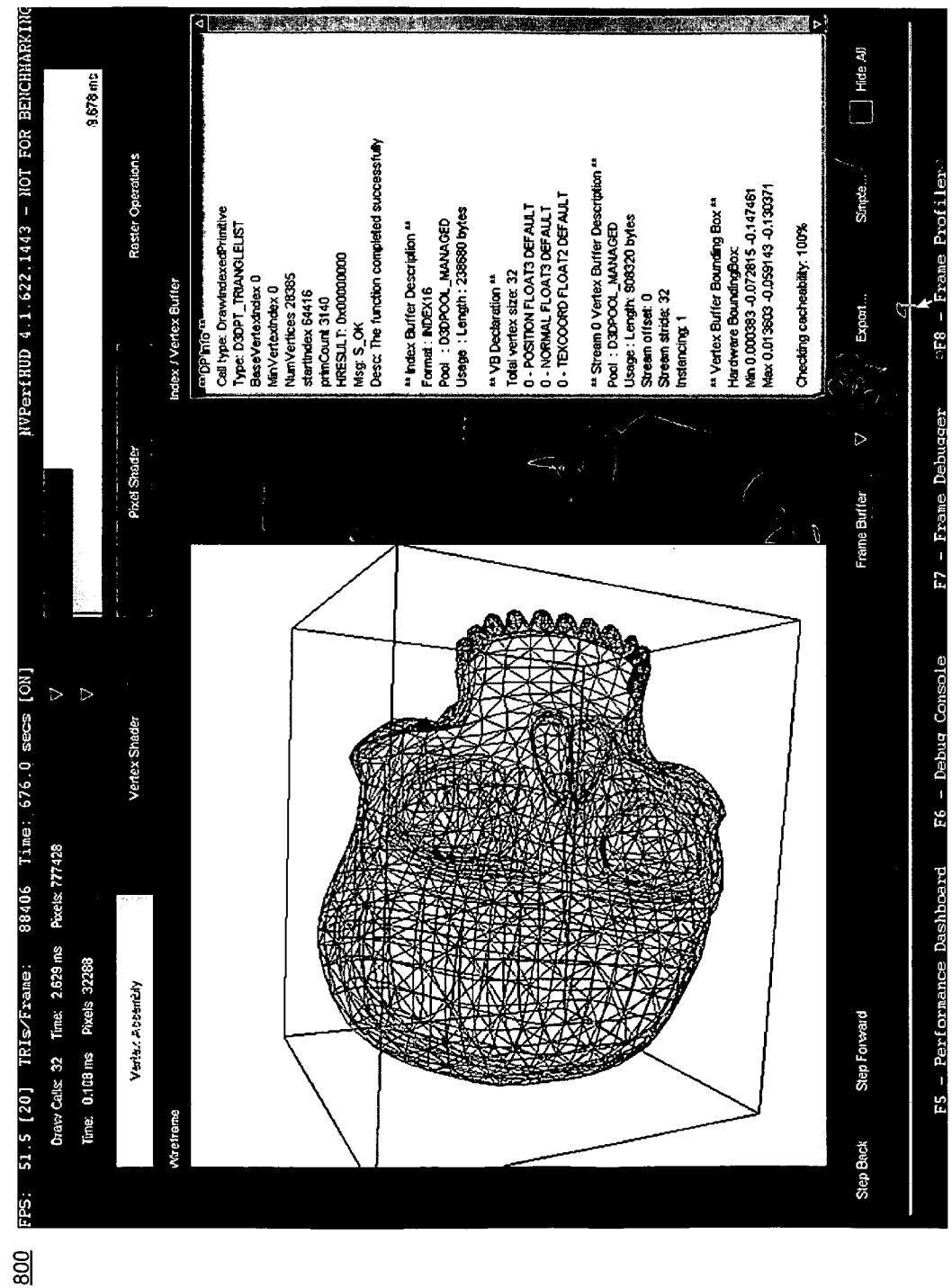
FIG. 8 shows a screen shot of an exemplary user interface for displaying state information corresponding to a selected draw call executed on a selected subunit in accordance with one embodiment of the present invention.

Referring now to FIG. 8, an exemplary user interface for displaying state information corresponding to a selected draw call executed on a selected subunit in accordance with one embodiment of the present invention is shown. In this example, the state information for draw call number 51 out of 67 is displayed in window 150. The graphical primitive 180 depicts a skull being drawn by the GPU pipeline. As discussed above, the state information may be edited affecting the performance and the execution of the selected draw call and/or the selected draw call group. As such, the user may scroll through different draw calls in order to examine the state information and examine each draw call in sequential order being executed and added as a new graphical primitive to the scene being drawn.

Figure 9:
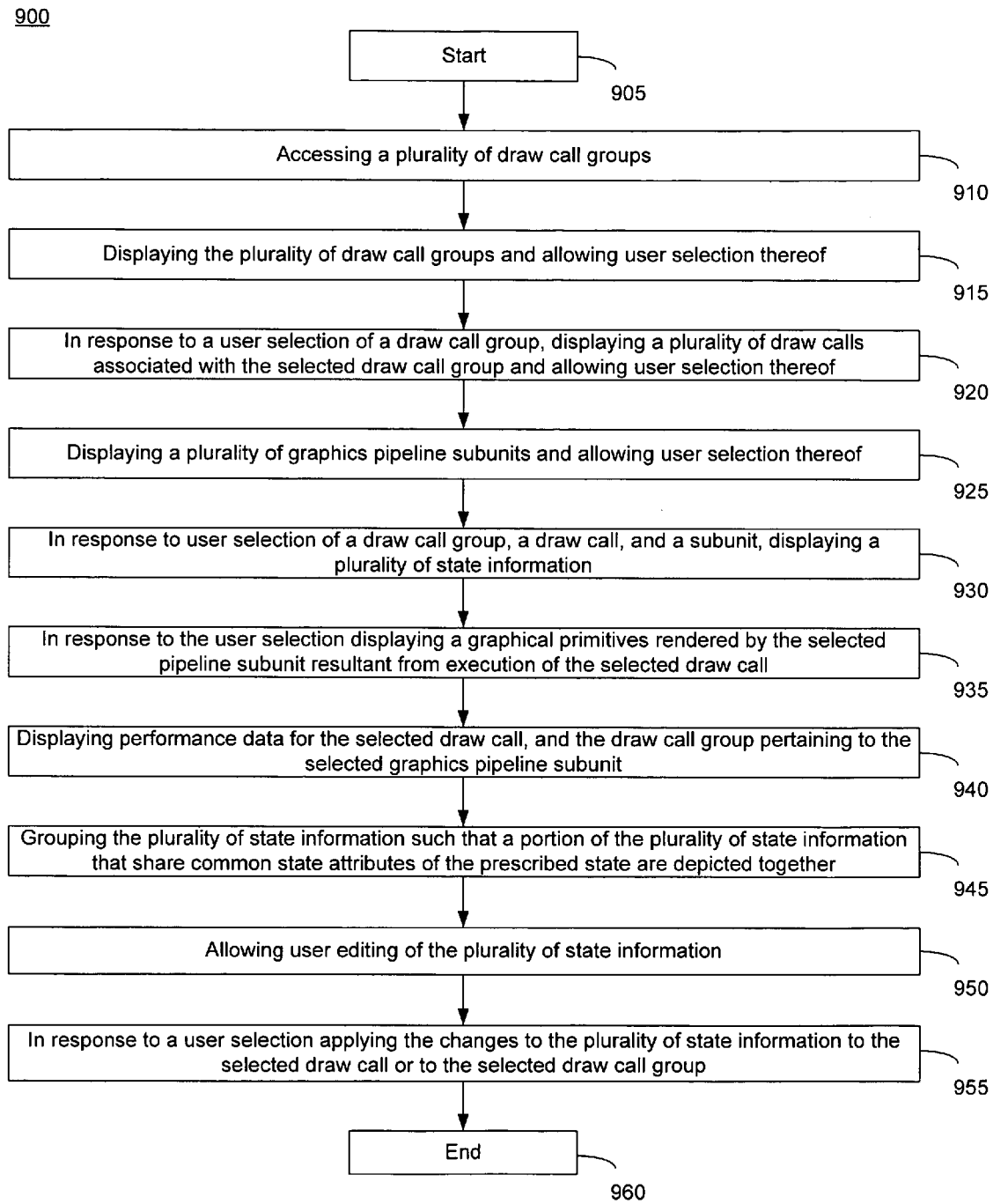
FIG. 9 shows a flow diagram of a computer implemented process for debugging an application operable on a graphics pipeline subunit in accordance with one embodiment of the present invention.

Referring now to FIG. 9, a flow diagram 900 of a computer implemented process for debugging an application operable on a graphics pipeline subunit in accordance with one embodiment of the present invention is shown. The method of debugging an application operable on a graphics pipeline subunit starts at step 905.

At step 910, a plurality of draw call groups is accessed form memory. As discussed above and incorporated by reference, a plurality of draw call groups are organized in response to a user selection of common state attributes of a prescribed state. Accordingly, each draw call group that contains a plurality of draw calls share prescribed common state attributes.

At step 915, a listing representing the plurality of draw call groups that is accessed are displayed in a first window. For example, the plurality of draw call groups may be displayed using a dropdown menu. It is appreciated that other methods to display the information may be employed. For example, a popup window may be used. The display further allows a user to select a draw call group of the listing. In one embodiment, the draw call groups are ordered in the listing by the execution time of the draw call group. The execution time of the draw call group is the time required for the draw call group to be executed by the GPU pipeline. In one embodiment, the plurality of draw call groups displayed may also display additional information such as the number of draw calls in each group, the execution time of the group and the number of pixels rendered.

At step 920, in response to a user selection of a draw call group, a plurality of draw calls associated with the selected draw call group are displayed in the first window or alternatively in a separate window. In one embodiment, the plurality of draw calls may be displayed as a listing using a dropdown menu. It is appreciated that other methods to display the information may be employed. For example, a popup window may be used. The display further allows a user to select a draw call. In one embodiment, the draw calls are ordered in the listing by the execution time of the draw call for a selected subunit.

At step 925, a plurality of graphics pipeline subunits are displayed in the first window or alternatively in a separate window. Moreover, the plurality of graphics pipeline subunits is user selectable. Accordingly, a user may select a subunit such that the user can inspect the selected draw call for the selected subunit.

At step 930, in response to user selection of the draw call group, the draw call, and the subunit, a plurality of associated state information may be displayed in a second window. It is appreciated, however, that the state information may be displayed in the first window or in a separate window. At step 935, graphical primitives are rendered by the selected pipeline subunit resultant from execution of the selected draw call. Changing the draw call or scrolling through various draw calls will update the graphical primitives in addition to updating the state information. Accordingly, a user may inspect the execution of each draw call, its state information and its corresponding graphical primitives, one step at a time.

At step 940, the performance data for the selected draw call and the draw call group pertaining to the selected graphics pipeline subunit is displayed. In one embodiment, the performance data are the frame execution time by the GPU pipeline, the selected draw call group execution time by the GPU pipeline, and the selected draw call execution time by the selected subunit. Other embodiments may provide utilization and bottleneck information for each subunit.

At step 945, the plurality of state information are grouped such that a portion of the plurality of state information that share common state attributes of the prescribed state are depicted together. In one embodiment, the grouping is by grouping state information with common state attributes in the same window. In another embodiment, the grouping is by color coding the groups. It is appreciated that other method for grouping the state information may be used.

At step 950, a user may edit the plurality of state information. In one embodiment, editing the state information changes the application. At step 955, editing the plurality of the state information is applied to the selected draw call or alternatively applied to the selected draw call group in response to a user selection. At step 960, the process of debugging an application operable on a graphics pipeline subunit ends.

Figure 10:
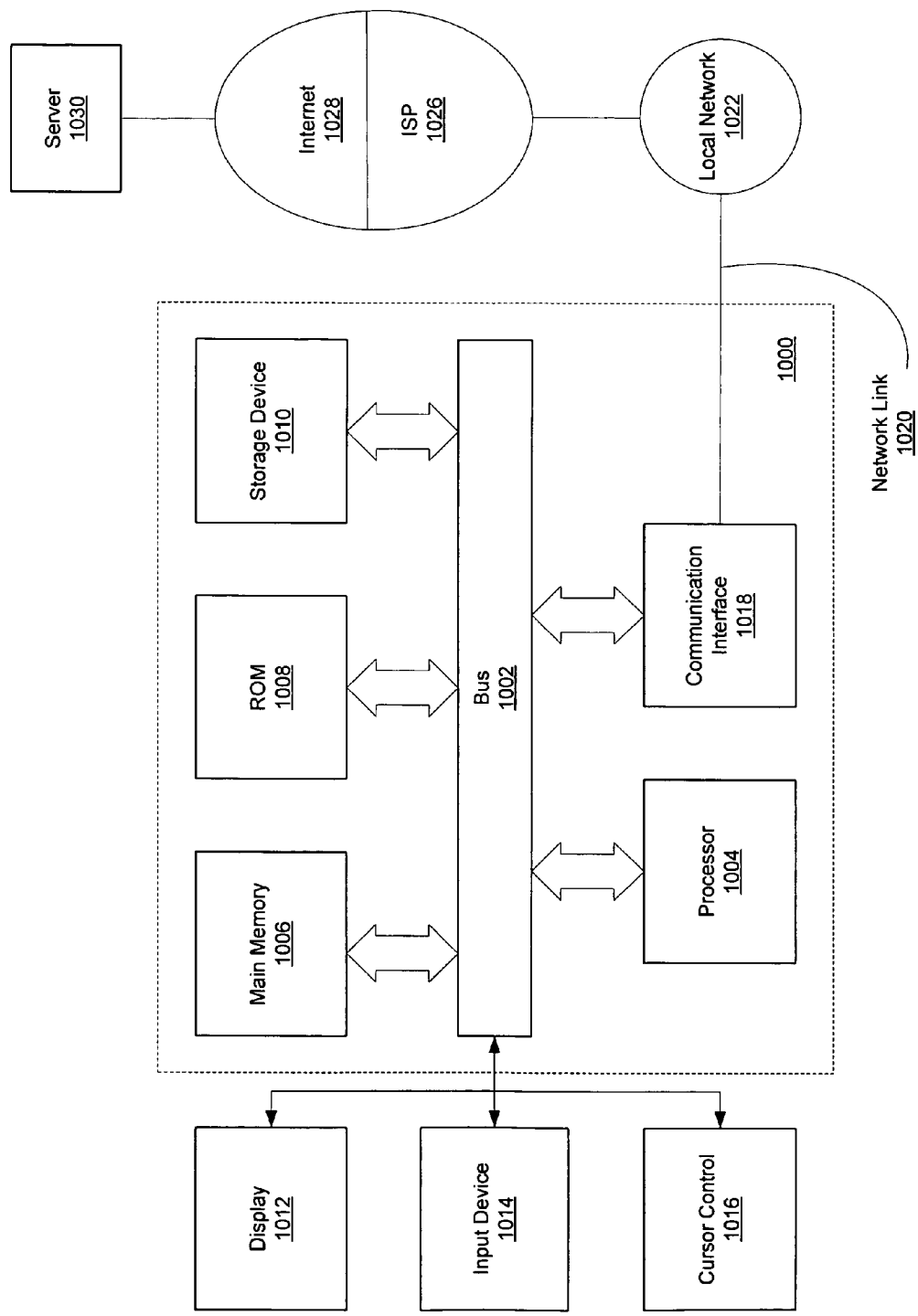
FIG. 10 illustrates a general purpose computer system that may serve as a platform for embodiments of the present invention.

FIG. 10 is a block diagram that illustrates a general purpose computer system 1000 upon which an embodiment of the invention may be implemented. Computer system 1000 may implement the method for debugging a graphics pipeline subunit as shown in FIG. 9 and includes a bus 1002 or other communication mechanism for communicating information, and a processor 1004 coupled with bus 1002 for processing information. Computer system 1000 also includes a main memory 1006, such as a random access memory (RAM) or other dynamic storage device, coupled to bus 1002 for storing information and instructions to be executed by processor 1004. Main memory 1006 also may be used for storing temporary variables or other intermediate information during execution of instructions to be executed by processor 1004. Computer system 1000 further includes a read only memory (ROM) 1008 or other static storage device coupled to bus 1002 for storing static information and instructions for processor 1004. A non-volatile storage device 1010, such as a magnetic disk or optical disk, is provided and coupled to bus 1002 for storing information and instructions and may store the persistent internal queue.

Computer system 1000 may be coupled via bus 1002 to an optional display 1012, such as a cathode ray tube (CRT), for displaying information to a computer user. An optional input device 1014, including alphanumeric and other keys, may be coupled to bus 1002 for communicating information and command selections to processor 1004. Another type of user input device is cursor control 1016, such as a mouse, a trackball, or cursor direction keys for communicating direction information and command selections to processor 1004 and for controlling cursor movement on display 1012.

The term "computer-readable medium" as used herein refers to any medium that participates in providing instructions to processor 1004 for execution. Such a medium may take many forms, including but not limited to, non-volatile media, volatile media, and transmission media. Non-volatile media includes, for example, optical or magnetic disks, such as storage device 1010. Volatile media includes dynamic memory, such as main memory 1006. Transmission media includes coaxial cables, copper wire and fiber optics, including the wires that comprise bus 1002. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Computer system 1000 can send and receive messages through the network(s), network link 1020 and communication interface 1018. In the Internet example, a server 1030 might transmit a requested code for an application program through Internet 1028, ISP 1026, local network 1022 and communication interface 1018. The received code may be executed by processor 1004 as it is received, and/or stored in storage device 1010, or other non-volatile storage for later execution.

In the foregoing specification, embodiments of the invention have been described with reference to numerous specific details that may vary from implementation to implementation. Thus, the sole and exclusive indicator of what is, and is intended by the applicants to be, the invention is the set of claims that issue from this application, in the specific form in which such claims issue, including any subsequent correction. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A graphical user interface operable for display on an electronic system executing on a processor and operable for debugging an application operable on a particular graphics pipeline subunit, said graphical user interface comprising:

a first window for rendering a plurality of draw call groups on a display and operable to allow user selection of a particular draw call group from said plurality of draw call groups, wherein each draw call group comprises a respective plurality of draw calls, and wherein all draw calls associated with each draw call group share common state attributes of a prescribed state;

a second window for rendering identifications of a plurality of graphics pipeline subunits on said display, and said second window further operable to allow user selection of said particular graphics pipeline subunit from said plurality of graphics pipeline subunits; and a third window operable to render a plurality of state information on said display, wherein said plurality of state information is associated with said particular graphics pipeline subunit and further associated with said particular draw call group and further associated with a selection of a particular draw call from respective draw calls of said particular draw call group.

2. The graphical user interface as described in claim 1 further comprising:

a fourth window for displaying graphical primitives rendered by said particular pipeline subunit resultant from execution of said particular draw call.

3. The graphical user interface as described in claim 1 further comprising:

a fourth window for displaying performance data associated with said particular draw call and further associated with said particular draw call group and further associated with said particular graphics pipeline subunit, wherein said performance data indicates a time for said plurality of graphics pipeline subunits to execute said particular draw call group, and wherein said performance data further indicates a time for said particular graphics pipeline subunit to execute said particular draw call.

4. The graphical user interface as described in claim 1, wherein said plurality of state information is user editable within said third window.

5. The graphical user interface as described in claim 1, wherein said plurality of draw call groups is ranked by execution time.

6. The graphical user interface as described in claim 1, wherein draw calls of said respective plurality of draw calls are ranked by execution time.

7. The graphical user interface as described in claim 1, wherein said plurality of state information are grouped such that a portion of said plurality of state information that are common across said particular draw call group are depicted in common.

8. A method of debugging an application operable on a particular graphics pipeline subunit, said method comprising:
　accessing a plurality of draw call groups, wherein each draw call group comprises a respective plurality of draw calls that all share common state attributes of a prescribed state;
　displaying in a first window said plurality of draw call groups and allowing user selection of a particular draw call group from said plurality of draw call groups;
　in response to said user selection of particular draw call group, displaying a plurality of draw calls associated with said particular draw call group and allowing user selection of a particular draw call from said plurality of draw calls associated with said particular draw call group;
　displaying in a second window, identifications of a plurality of graphics pipeline subunits and allowing user selection of said particular graphics pipeline subunit from said plurality of graphics pipeline subunits; and
　in response to said user selection of said particular graphics pipeline subunit and further responsive to said user selection of said particular draw call, displaying a plurality of state information associated with said particular graphics pipeline subunit and further associated with said particular draw call.

9. The method as described in claim 8 further comprising:
　displaying graphical primitives rendered by said particular pipeline subunit resultant from execution of said particular draw call.

10. The method as described in claim 8 further comprising:
　displaying performance data associated with said particular draw call and further associated with said particular draw call group pertaining to said particular graphics pipeline subunit, wherein said performance data indicates a time for said plurality of graphics pipeline subunits to execute said particular draw call group, and wherein said performance data further indicates a time for said particular graphics pipeline subunit to execute said particular draw call.

11. The method as described in claim 8 further comprising:
　allowing user editing of said plurality of state information.

12. The method as described in claim 8, wherein said plurality of draw call groups is ranked by execution time.

13. The method as described in claim 8, wherein draw calls of said respective plurality of draw calls are ranked by execution time.

14. The method as described in claim 8, wherein displaying said plurality of state information further comprises:
　grouping said plurality of state information such that a portion of said plurality of state information that are common across said particular draw call group are depicted together.

15. A non-transitory computer-storage readable storage medium comprising instructions that when executed implement a method for debugging a particular graphics pipeline subunit, said method comprising:
　displaying in a first window a plurality of draw call groups and allowing user selection of a particular draw call group from said plurality of draw call groups, wherein each draw call group comprise a respective plurality of draw calls that all share common state attributes of a prescribed state;
　in response to a user selection of said particular draw call group, displaying a plurality of draw calls associated with said particular draw call group and allowing user selection of a particular draw call from said plurality of draw calls associated with said particular draw call group;
　displaying in a second window, identifications of a plurality of graphics pipeline subunits and allowing user selection of said particular graphics pipeline subunit from said plurality of graphics pipeline subunits; and
　in response to said user selection of said particular graphics pipeline subunit and further responsive to said user selection of said particular draw call, displaying state information associated with said particular graphics pipeline subunit and further associated with said particular draw call.

16. The non-transitory computer-readable storage medium as described in claim 15 wherein said method further comprises:
　displaying graphical primitives rendered by said particular pipeline subunit resultant from execution of said particular draw call.

17. The non-transitory computer-readable storage medium as described in claim 15 wherein said method further comprises:
　displaying performance data associated with said particular draw call and further associated with said particular draw call group pertaining to said particular graphics pipeline subunit, wherein said performance data indicates a time for said plurality of graphics pipeline subunits to execute said particular draw call group, and wherein said performance data further indicates a time for said particular graphics pipeline subunit to execute said particular draw call.

18. The non-transitory computer-readable storage medium as described in claim 15, wherein said displaying said state information further comprises:
　grouping said state information such that a portion of said state information that are common across said particular draw call group are depicted in common.

19. The non-transitory computer-readable storage medium as described in claim 15 wherein said method further comprises:
　allowing user editing of said state information.

20. The non-transitory computer-readable storage medium as described in claim 15, wherein said plurality of draw call groups is ranked by execution time.

21. The non-transitory computer-readable storage medium as described in claim 15, wherein draw calls of said respective plurality of draw calls are ranked by execution time.

22. The non-transitory computer-readable storage medium as described in claim 15 wherein said method further comprises:
　allowing user selection of different channels.

* * * * *